United States Patent [19]
Arosio

[11] Patent Number: 5,452,736
[45] Date of Patent: Sep. 26, 1995

[54] RAPID FASTENER, FOR CONNECTING PIPELINES FOR SYSTEMS FOR CONVEYING PRESSURIZED GAS

[75] Inventor: Massimo Arosio, Melzo, Italy

[73] Assignee: Faster S. r. L., Melzo, Italy

[21] Appl. No.: 200,154

[22] Filed: Feb. 23, 1994

[30] Foreign Application Priority Data

Feb. 24, 1993 [IT] Italy .................... MI93A0362

[51] Int. Cl.⁶ .................... F16K 31/12; F16L 37/28
[52] U.S. Cl. ........................ 137/75; 137/614.03
[58] Field of Search .................... 137/614.03, 25, 137/75

[56] References Cited

U.S. PATENT DOCUMENTS 3,245,423 4/1966 Haunsen et al. .................... 137/75 X
5,027,845 7/1991 Silagy .................... 137/75 X Primary Examiner—John C. Fox
Attorney, Agent, or Firm—Kirschstein et al.

[57] ABSTRACT

A rapid fastener for connecting pipelines for conveying pressurized gas and exhibits a structural part which is provided, at its end, with a recess into which there can be introduced a structural part provided with a projection, and wherein the recessed structural part receives, on the inner side, spring means which act upon series-connected displaceable sleeves and are interconnected by means of a valve body and a valve guide plate, a displaceable sleeve and the valve guide plate being actively connected by a structural part consisting of a metal alloy having a low melting point and receiving, on its outer side, a sleeve which is axially displaceable and constitutes a holding device for the structural part.

6 Claims, 4 Drawing Sheets

RAPID FASTENER, FOR CONNECTING PIPELINES FOR SYSTEMS FOR CONVEYING PRESSURIZED GAS

BACKGROUND OF THE INVENTION

Field of the Invention

The present invention relates to a rapid fastener for connecting pipelines for systems of a commercial or private nature, for conveying pressurized gas or another fluid.

It is known that there are numerous types of rapid fasteners, e.g. for connecting gas lines, on the market.

Rapid fasteners of this type generally comprise a first structural part exhibiting, at its end, a projecting connecting part which is insertable into an open endpiece of a second structural part exhibiting a corresponding recess.

Conventionally, the two structural parts of the rapid fastener are connected by a bayonet-type connection, the mutual barring of the structural parts being effected by the twisting of a union nut or by the actuation of a ring exhibiting a quarter-turn fastener.

Rapid fasteners which are configured in this way exhibit considerable drawbacks.

It is thus necessary to use both hands, for example, to connect the two structural parts, since a tensioning nut or union nut needs to be actuated manually.

Furthermore, a structural part of the non-joined-together rapid fastener exhibits a deep recess in which dust and dirt can accumulate.

These dirt accumulations can lead to obstacles in joining together the structural parts of the rapid fastener.

SUMMARY OF THE INVENTION

Objects of the Invention

The object of the present invention is to avoid the shortcomings and drawbacks of the prior art and to propose a new rapid fastener with which it is possible to conduct the connection of the two structural parts using just one hand. A further object of the invention consists in providing a rapid fastener in which the recessed structural part, when the rapid fastener is not joined together, exhibits an essentially flat end face by which the recess is covered in the interior of the structural part.

A further object of the invention consists in proposing a rapid fastener with which it is possible to prevent a dangerous escape of gas in the event of fire. Moreover, the invention is intended to provide a rapid fastener whose structural features ensure high operating reliability and which can be manufactured using simple structural parts.

The invention thus provides for a rapid fastener which represents an advance when viewed from the economic aspect.

The objects according to the invention are achieved by virtue of a rapid fastener which is particularly suitable for connecting pipelines for conveying pressurized gas and exhibits a structural part which is provided, at its end, with a recess into which there can be introduced a structural part provided with a projection, and wherein the recessed structural part receives, on the inner side, spring means which act upon series-connected displaceable sleeves and are interconnected by means of a valve body and a valve guide plate, a displaceable sleeve and the valve guide plate being actively connected by a structural part consisting of a metal alloy having a low melting point and receiving, on its outer side, a sleeve which is axially displaceable and constitutes a holding device for the structural part.

BRIEF DESCRIPTION OF THE DRAWINGS

Further features and advantages of the subject of the invention can be derived from the following description of a preferred illustrative embodiment.

The construction of the rapid fastener according to the present invention is now represented with reference to an illustrative embodiment in the drawings, in which.

DETAILED DESCRIPTION OF THE PREFERRED EMBODIMENTS

Figure 1:
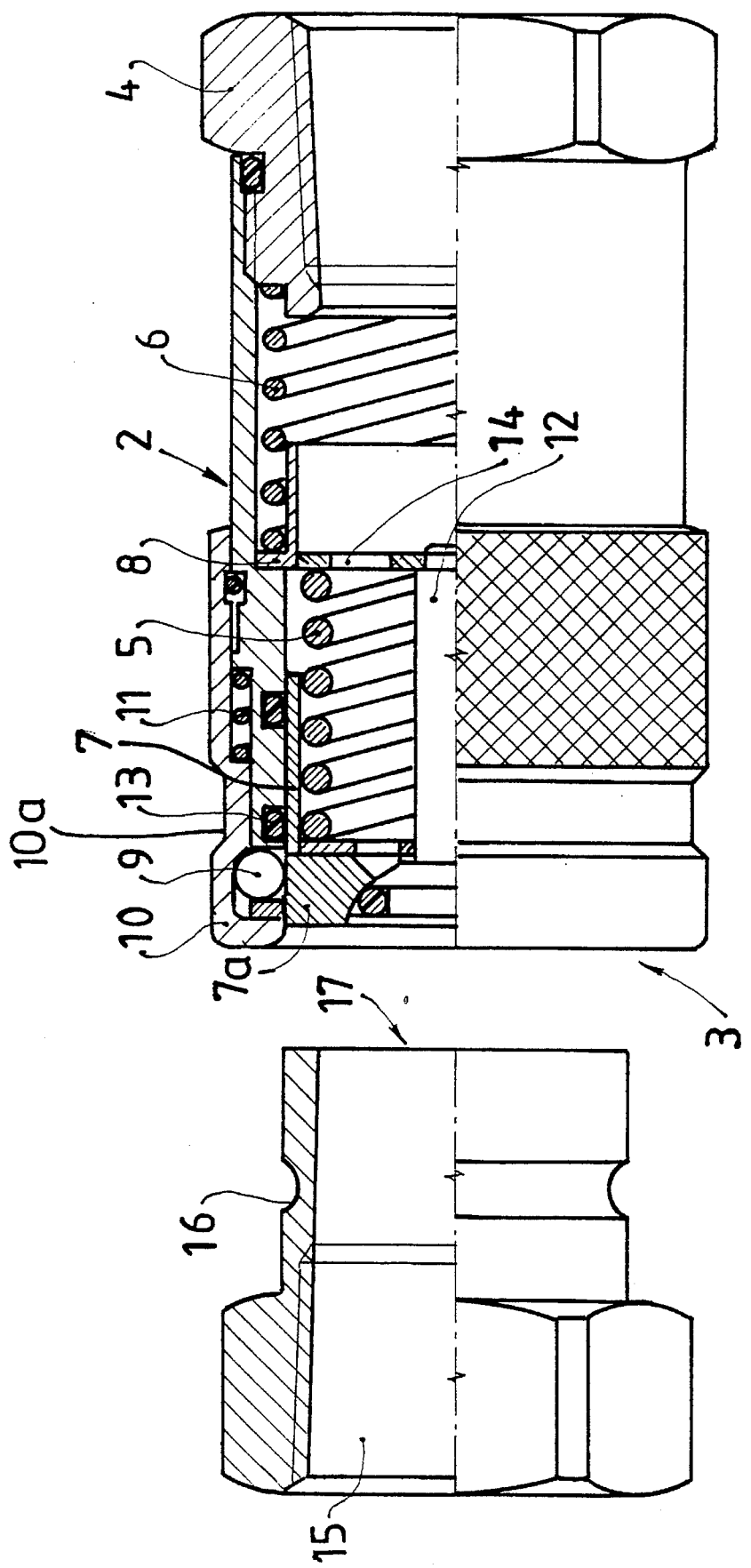
FIG. 1 shows a front view, partly in section, of the rapid fastener according to the invention.

In the drawings, the rapid fastener for connecting the lines of a system fueled by pressurized gas or a fluid are identified by the reference symbol 1.

The rapid fastener 1 comprises a structural part 2 exhibiting, at one end, a recess 3. At the opposite end, the structural part 2 is provided with a connecting pipe 4.

The structural part 2 is conventionally fastened to the pipage and comprises a large number of components. The structural part 2 exhibits, on its inner side, two spring means, e.g. helical springs 5 and 6, which are biased towards holding two metal sliding sleeves 7 and 8 in a position such that the recess 3 of the structural part 2 is closed off by a bulge 7a of the sleeve 7 and by a valve body 12 and in which an accumulation of dirt and dust in the recess 3 is prevented.

The annular bulge 7a, in its forwardly directed setting, is biased towards displacing a ball cage 9a, which is advantageously made of metal or some other suitable material. The balls 9 of the cage 9a (when the balls 9 are in a position in which they are displaced radially outwards) block a spring-loaded locking sleeve 10.

The spring means acting upon the sleeve 10 comprises a helical spring 11.

Figure 2:
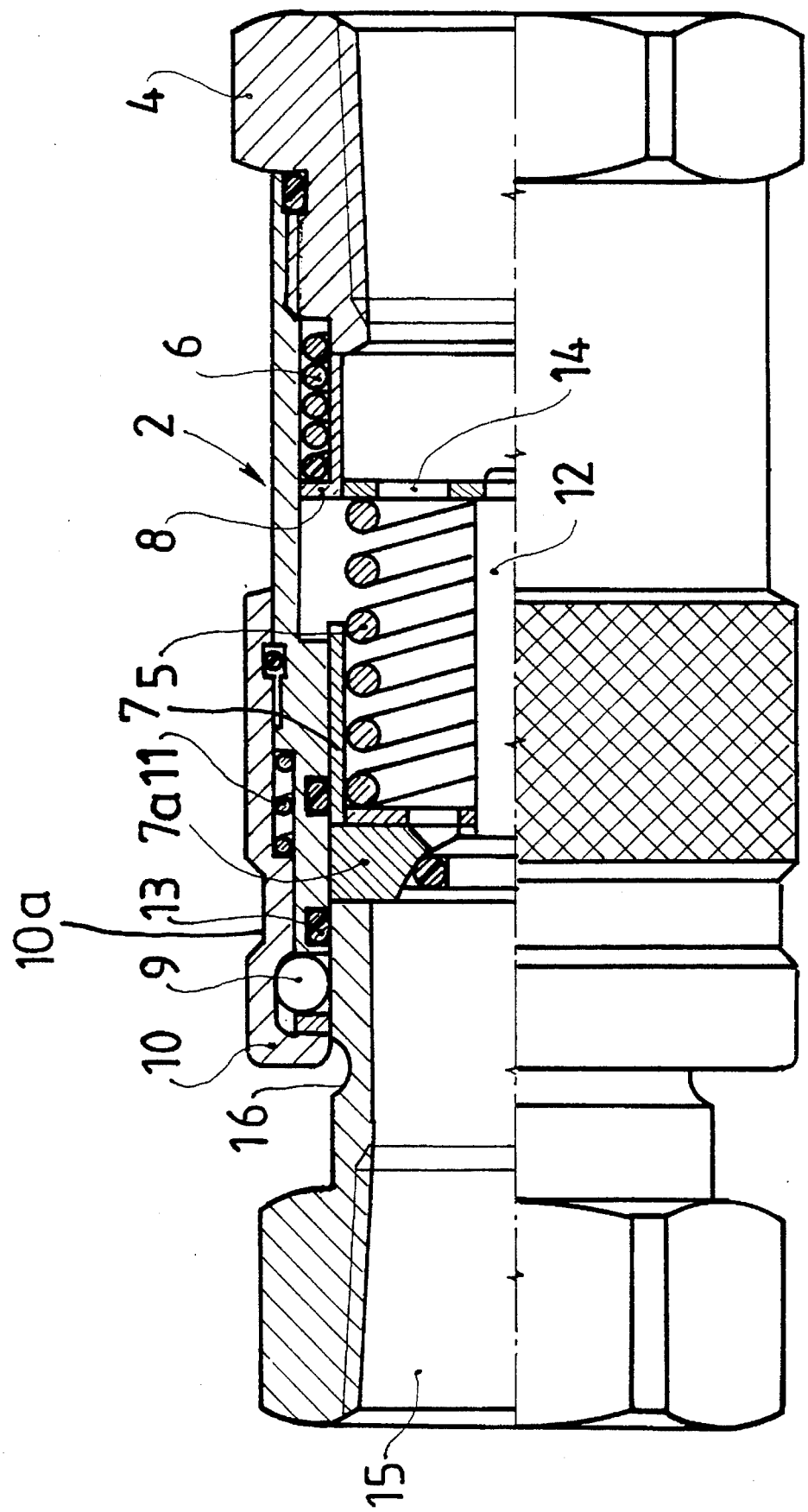
FIG. 2 shows a front view, partly in section, of the rapid fastener according to the invention at the start of the two structural parts being joined together.

When the connecting piece 17 protruding from the structural part 15 is introduced into the recess 3 in the structural part 2, as represented in FIG. 2, a displacement of the bulge 7a is brought about in the direction of the sleeve 8 and the plate 14, whereupon the bulge 7a and the sleeve 8 are interconnected by a guide plate 14 which is fastened to the valve body 12. A displacement of the plate 14 gives rise to a tensioning of the spring 6.

The sleeve 8 can be displaced up to the point where it abuts the connecting pipe 4. In this position, the structural part 15 enters into active connection with a sealing ring 13 in order to prevent the gas, in this position of the rapid fastener, from escaping from the pipeline.

Figure 3:
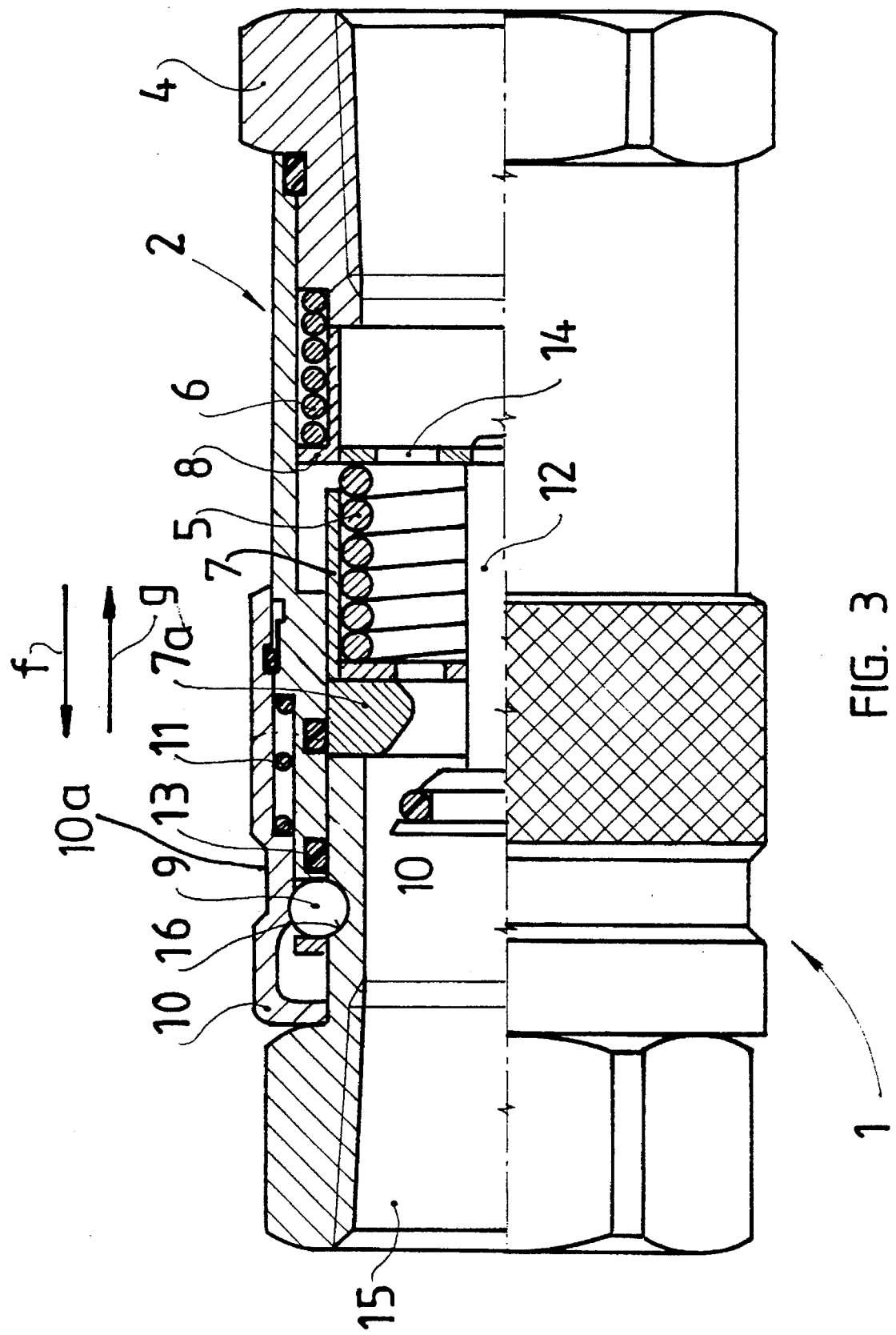
FIG. 3 shows a front view, partly in section, of the rapid fastener according to the invention, after having been joined together.
Figure 4:
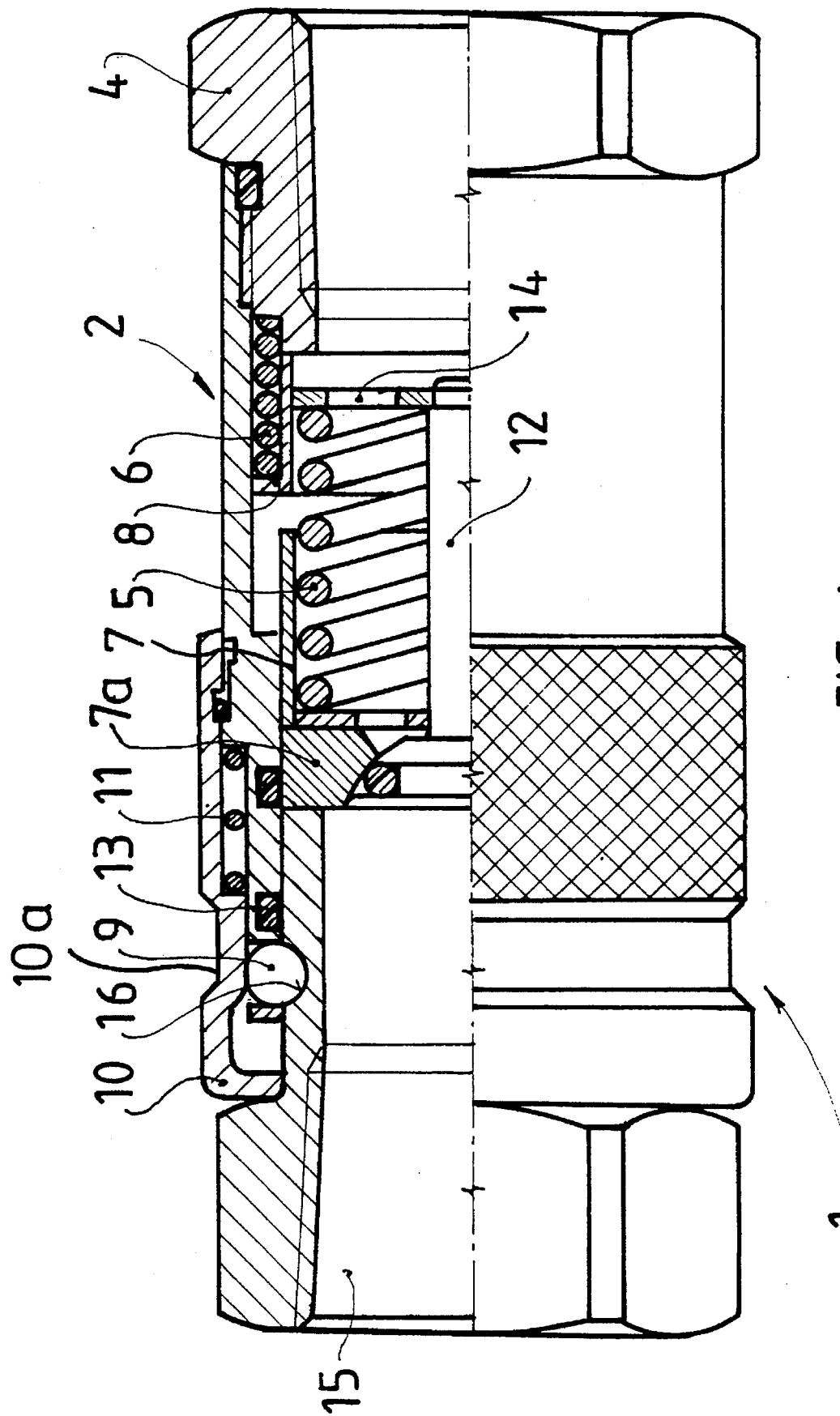
FIG. 4 shows a front view, partly in section, of the rapid fastener according to the invention under the influence of heat, e.g. upon the occurrence of a fire.

The gradual introduction of the protruding structural part 15 into the recess 3, as can be seen from FIG. 3, brings about a-displacement of the valve body 12 relative to the annular bulge 7a and a gradual opening of the throughflow, since the bulge 7a is hereupon displaced.

The joining-together movement of the structural parts of the rapid fastener is interrupted whenever the groove 16, which is disposed on the periphery of the structural part 15, coincides with the balls 9 of the ball ring 9a and a locking operation is provoked. Due to the thrust of the compressed spring 11, a displacement movement of the sleeve 10 (arrow f) is induced.

In order to loosen the structural parts, it is sufficient, using just one hand, to displace the sleeve 10 rearward (arrow g in FIG. 3) such that the balls 9 again leave the groove 16 and, under the effect of the springs 5 and 6, bring the displaceable parts 7, 7a and 8 again into active connection with the valve body 12 in order thereby to interrupt the flow of the gas current.

A particular feature of the rapid fastener according to the invention consists in the fact that the sliding sleeve 8 and the valve body 12 are connected by the plate 14 or by some other structural part and the plate consists of a metal alloy which has a low melting point (approx. 100° C.).

In the event of strong heat influence to values exceeding 100° C., e.g. in the event of fire, a melting of this structural part 14 and a loosening of the connection between the valve body 14 and sleeve 8 and a release of the spring 5 is initiated, which spring provokes a return travel of the guide plate 14 together with the valve body 12.

The passage of the gas or fluid between the valve body 12 and the annular bulge 7a, e.g. in the event of fire, is thereby automatically interrupted. An excellent fire-protection mechanism is thereby additionally created.

I claim:

1. A fluid coupling arrangement, comprising:
   a) a first structural part including
      i) a tubular housing extending along a longitudinal axis between one end region in fluid communication with a conduit, and an opposite end region,
      ii) an abutment sleeve in the housing and axially movable from a remote position spaced from the conduit, to an abutment position engaging the conduit,
      iii) an abutment spring for biasing the abutment sleeve to the remote position,
      iv) a valve including
         a) a valve sleeve having a head that forms a valve seat, and axially movable from a closed position to an open position,
         b) a valve body in the sleeve and engaging the valve seat in the closed position, and
         c) a valve spring for biasing the valve sleeve to the closed position,
      v) means for connecting the valve and the abutment sleeve in a force-transmitting relationship, said connecting means including a plate connected to the abutment sleeve and the valve body, said plate being constituted of a metal having a melting point on the order of 100° C.,
      vi) a locking collar axially movable exteriorly of the housing at said opposite end region, and
      vii) a chase of balls mounted in the collar for joint movement therewith;
   b) a second structural part including
      i) a tubular extension axially insertable through said opposite end region of the housing for mating with the first structural part,
      ii) said extension engaging the valve and initially axially moving the valve sleeve, the connecting means and the abutment sleeve until the abutment sleeve reaches the abutment position, and thereupon for axially moving the valve sleeve to the open position, and
      iii) said extension having an annular groove into which the balls are received when the valve sleeve is in the open position; and
   c) means for sealingly engaging the structural parts to prevent fluid leakage during mating, including a sealing ring interiorly mounted on the first structural part for engaging the extension before the valve sleeve is moved away from the closed position.

2. The arrangement of claim 1, wherein the valve spring is located between the head of the valve sleeve and the plate.

3. A fluid coupling arrangement, comprising:
   a) a first structural part including
      i) a tubular housing extending along a longitudinal axis between one end region in fluid communication with a conduit, and an opposite end region,
      ii) an abutment sleeve in the housing and axially movable from a remote position spaced from the conduit, to an abutment position engaging the conduit,
      iii) an abutment spring for biasing the abutment sleeve to the remote position,
      iv) a valve including
         a) a valve sleeve having a head that forms a valve seat, and axially movable from a closed position to an open position,
         b) a valve body in the sleeve and engaging the valve seat in the closed position, and
         c) a valve spring for biasing the valve sleeve to the closed position,
      v) means for connecting the valve and the abutment sleeve in a force-transmitting relationship;
   b) a second structural part including
      i) a tubular extension axially insertable through said opposite end region of the housing for mating with the first structural part, and
      ii) said extension engaging the valve and initially axially moving the valve sleeve, the connecting means and the abutment sleeve until the abutment sleeve reaches the abutment position, and thereupon for axially moving the valve sleeve to the open position; and
   c) said connecting means being constituted of a heat-sensitive material which, when exposed to heat above a predetermined temperature, releases the connection between the valve and the abutment sleeve.

4. The arrangement of claim 3, wherein the connecting means includes a plate connected to the abutment sleeve and the valve body.

5. The arrangement of claim 4, wherein the plate is constituted of a metal having a melting point on the order of 100° C.

6. The arrangement of claim 4, wherein the valve spring is located between the head of the valve sleeve and the plate.

* * * * *